United States Patent
Dormody et al.

(10) Patent No.: US 10,378,894 B2
(45) Date of Patent: Aug. 13, 2019

(54) SYSTEMS AND METHODS FOR ESTIMATING AND ALTITUDE OF A MOBILE DEVICE BASED ON DETECTED TEMPERATURE CONDITIONS

(71) Applicant: NextNav, LLC, Sunnyvale, CA (US)

(72) Inventors: Michael Dormody, San Jose, CA (US); Badrinath Nagarajan, San Jose, CA (US); Guiyuan Han, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 184 days.

(21) Appl. No.: 15/683,513

(22) Filed: Aug. 22, 2017

(65) Prior Publication Data

US 2018/0252522 A1    Sep. 6, 2018

Related U.S. Application Data

(60) Provisional application No. 62/467,716, filed on Mar. 6, 2017.

(51) Int. Cl.
| | | |
|---|---|---|
| *G01C 5/06* | (2006.01) | |
| *G01C 25/00* | (2006.01) | |
| *G01K 7/00* | (2006.01) | |
| *G01L 7/00* | (2006.01) | |

(52) U.S. Cl.
CPC ............... *G01C 5/06* (2013.01); *G01C 25/00* (2013.01); *G01K 7/00* (2013.01); *G01L 7/00* (2013.01)

(58) Field of Classification Search
None
See application file for complete search history.

(56) References Cited

U.S. PATENT DOCUMENTS

| | | | |
|---|---|---|---|
| 9,057,606 B2 | 6/2015 | Wolf | |
| 2015/0247917 A1* | 9/2015 | Gum | H04W 4/029 342/452 |
| 2016/0047649 A1* | 2/2016 | Edge | H04W 4/025 455/73 |

(Continued)

*Primary Examiner* — Andre J Allen
(74) *Attorney, Agent, or Firm* — Kyle Pendergrass

(57) ABSTRACT

Identifying and estimating values of atmospheric conditions for use in estimating an altitude of a mobile device. Systems and methods for monitoring one or more conditions before estimating an altitude of a mobile device may receive a reference pressure that was determined using a measurement of pressure measured by a reference pressure sensor, and determine if a temperature condition is detected. After determining that the temperature condition is not detected, the systems and methods may compute a first estimate of an altitude of a mobile device using the reference pressure. After determining that the temperature condition is detected, the systems and methods may compute an estimate of a pressure at the location of the reference pressure sensor using the reference pressure, a first measurement of temperature that was used to compute the reference pressure, an estimated altitude of the location of the reference pressure sensor, and the reference altitude, and then compute a second estimate of the altitude of the mobile device using the estimate of pressure and a second measurement of temperature that was measured at another location that is different from the location of the reference pressure sensor.

20 Claims, 6 Drawing Sheets

(56) References Cited

U.S. PATENT DOCUMENTS

| | | | |
|---|---|---|---|
| 2016/0102995 A1* | 4/2016 | Gum | H04W 4/043 |
| | | | 702/98 |
| 2016/0258749 A1* | 9/2016 | MacGougan | G01C 5/06 |
| 2017/0195984 A1* | 7/2017 | Dormody | G01C 5/06 |
| 2017/0276483 A1* | 9/2017 | Dormody | H04W 4/02 |
| 2018/0003494 A1* | 1/2018 | Fleming | G01C 5/06 |

* cited by examiner

SYSTEMS AND METHODS FOR ESTIMATING AND ALTITUDE OF A MOBILE DEVICE BASED ON DETECTED TEMPERATURE CONDITIONS

BACKGROUND

A barometric-based approach for estimating an altitude of a mobile device requires (i) an accurate estimate of pressure at a location of the mobile device, (ii) an accurate estimate of pressure at a location of a remote pressure sensor, (iii) an accurate estimate of temperature at a location of a remote temperature sensor or at the location of the mobile device, and (iv) a known altitude of the remote pressure sensor, where the location of the remote pressure sensor and the location of the remote temperature sensor may be the same location or different locations. An estimate of an altitude of the mobile device ($h_{mobile}$) can be computed as follows:

$$h_{mobile} = h_{sensor} + \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device, $P_{sensor}$ is the accurate estimate of pressure at the location of the remote pressure sensor, $T_{remote}$ is the accurate estimate of temperature at the location of the remote temperature sensor, $h_{sensor}$ is the known altitude of the remote pressure sensor, g corresponds to the acceleration due to gravity, R is the universal gas constant, and M is the molar mass of air (e.g., dry air or other).

In some cases, the estimate of pressure at the location of the remote pressure sensor is converted to a reference pressure that specifies an estimate of pressure at a reference altitude as follows:

$$P_{ref} = P_{sensor} \exp\left(-\frac{gM(h_{ref} - h_{sensor})}{RT_{remote}}\right), \quad \text{(Equation 2)}$$

where $P_{sensor}$ is the accurate estimate of pressure at the location of the remote pressure sensor, $P_{ref}$ is the reference pressure at a reference altitude, and $h_{ref}$ is the reference altitude. The altitude of the mobile device, $h_{mobile}$ is computed using Equation 1, where $h_{ref}$ is substituted for $h_{sensor}$ and $P_{ref}$ is substituted for $P_{sensor}$. The reference altitude, $h_{ref}$ may be any altitude, and is often set at sea-level.

When two or more reference pressures are available, the reference pressures are combined into a single reference pressure value (e.g., using an average, weighted average, or other suitable combination of the reference pressures), and the single reference pressure value is used for the reference pressure, $P_{ref}$.

As one of ordinary skill in the art will appreciate from Equation 1 and Equation 2, the estimate of the mobile device's altitude, $h_{mobile}$, will be not be accurate if the estimate of the remote temperature, $T_{remote}$, is not accurate. Accuracy of the estimate of the remote temperature, $T_{remote}$, is particularly critical since it impacts the accuracy of the reference pressure, $P_{ref}$ from Equation 2, and the accuracy of the estimate of the mobile device's altitude, $h_{mobile}$, from Equation 1.

Unfortunately, a reference pressure can be computed using a temperature measurement of unknown accuracy, as is often the case for many crowdsourced weather stations like NOAA, Weather Underground, Earth Networks, or hobby grade weather stations installed by private individuals at their homes or businesses. In some cases, the temperature measurement is not accurate, which makes the reference pressure unreliable for use in computing an estimate of an altitude of a mobile device. Described below are systems and methods for determining if a reference pressure based on an estimate of a remote temperature is accurate enough for use in computing an estimate of a mobile device's altitude, and for determining other data for use in computing an estimate of a mobile device's altitude when the reference pressure is determined to not be accurate enough for use in computing an estimate of a mobile device's altitude.

DETAILED DESCRIPTION

An estimate of a mobile device's altitude, $h_{mobile}$, can be accurately computed so long as the following information is available and accurate: (i) an estimate of a local pressure at a location of a mobile device, $P_{mobile}$, a reference pressure, $P_{ref}$ that specifies an estimate of pressure at a reference altitude, $h_{ref}$, and (iii) an estimate of a remote temperature, $T_{remote}$. The estimate of the mobile device's altitude, $h_{mobile}$, can be computed as follows:

$$h_{mobile} = h_{ref} + \frac{RT_{remote}}{gM} \ln\left(\frac{P_{ref}}{P_{mobile}}\right), \quad \text{(Equation 3)}$$

where g corresponds to the acceleration due to gravity, R is the universal gas constant, and M is the molar mass of air (e.g., dry air or other).

Unfortunately, the reference pressure, $P_{ref}$, may be unreliable and inaccurate when based on temperature measurements (e.g., $T_{remote}$) from certain sources, including crowdsourced weather stations, which produce weather data that can be useful in weather prediction owing to a spatially dense network, but that may not be accurate enough for use in navigation or location services (e.g., e911 and others). Solutions to this problem are described below, including systems and methods for determining that a reference pressure based on an estimate of a remote temperature is not accurate enough for use in computing an estimate of a mobile device's altitude, and for determining other data that can be used in computing the estimate of the mobile device's altitude.

Benefits of the systems and methods described below include quality control improvements of existing weather data so that weather data can be used for barometric-based altitude determination in connection with navigation, emergency services, and other uses of estimated altitudes with an accuracy of one to two meters. Such existing weather data is widely available and meant to be used for weather forecasts, but the weather data is sometimes not accurate enough for the accuracy requirements of barometric-based altitude determinations. These accuracy requirements can be achieved using different systems and methods described below in connection with the figures. In some circumstances, such as when more-accurate weather data is used for navigation or emergency services, the weather data used should have high pressure resolution (e.g., pressure data from a weather station is precise to within a few Pa) and should have high temporal resolution (e.g., pressure data from a weather station is recent to within several minutes).

Figure 1:
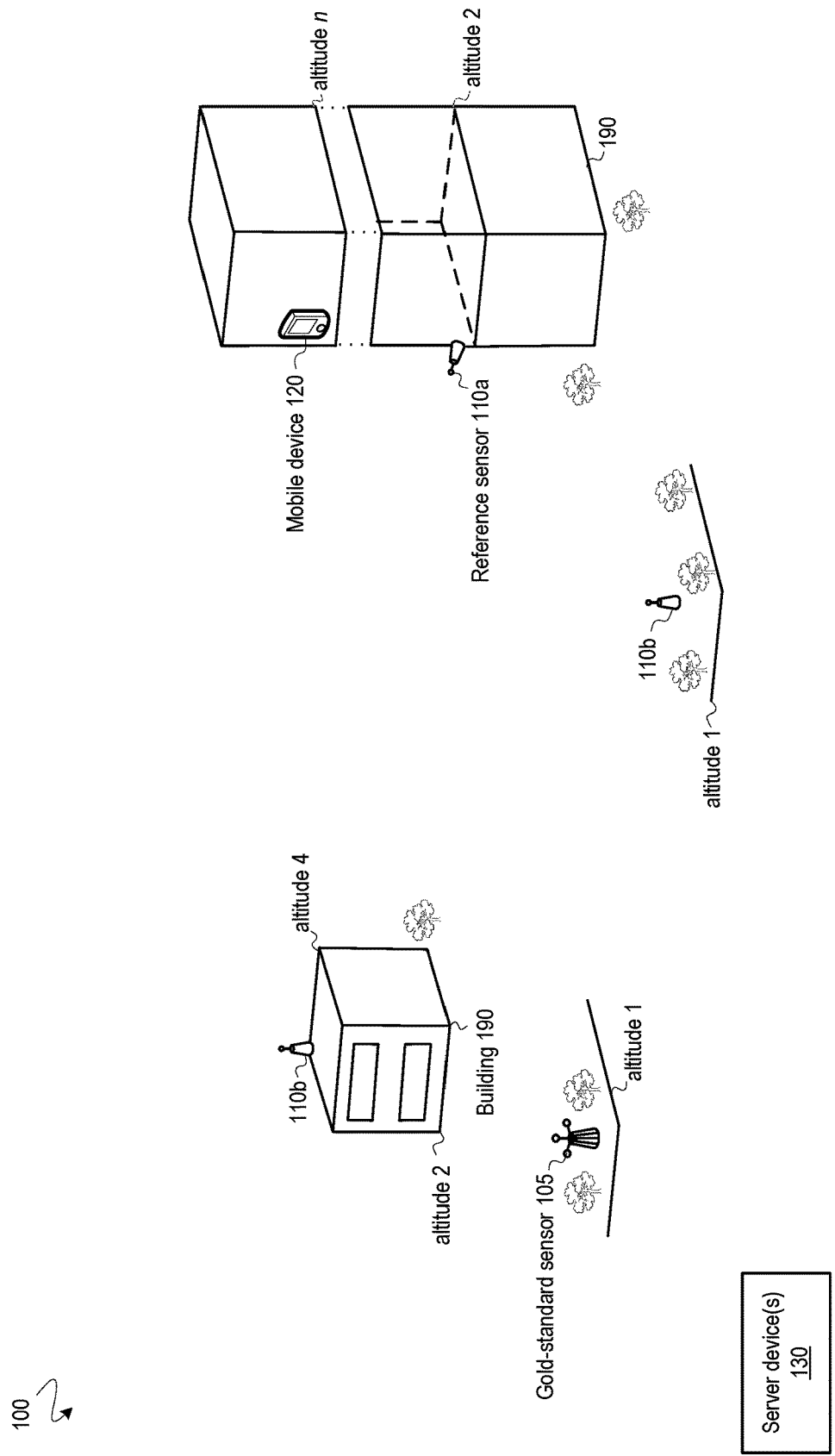
FIG. 1 depicts an operational environment for determining values of atmospheric conditions for use in estimating an altitude of a mobile device.

Attention is initially drawn to FIG. 1, which illustrates an operational environment 100 for determining values of atmospheric conditions for use in estimating an altitude of a mobile device. As shown, the operational environment 100 includes one or more gold-standard sensors 105, one or more reference sensors 110 (e.g., sensors 110a, 110b and/or 110c), one or more mobile devices 120, and one or more server devices 130. Each of the gold-standard sensors 105, the reference sensors 110, and the mobile device 120 may be located at different altitudes or depths that are inside or outside buildings 190. If these sensors are located inside buildings, compensation for any present HVAC/Stack Effect that impacts accuracy of pressure measurements relative to true pressure should be made—for examples of how such compensation can be accomplished, see U.S. application Ser. No. 15/487,215, filed Apr. 13, 2017 (CHARACTERIZING AND USING BUILDING WEATHER PROFILE PARAMETERS), which is incorporated herein by reference. If these sensors are located inside buildings, then temperature values used in equations should be sourced from an externally placed source that is not internal to any building.

The mobile device 120 is located at an unknown altitude and may take different forms, including a mobile phone, tablet, laptop, tracking tag, receiver, or another suitable device. Each of the gold-standard sensors 105 is located at a known location. Each of the reference sensors 110 is also located at a known location. Known locations may comprise an altitude, an address, a building, a building floor, a place, or other location information.

Each gold-standard sensor 105 may comprise one or more different sensors, including a pressure sensor and/or a temperature sensor. A gold-standard sensor 105 provides measurements that are within a tolerated amount of error from truth as would be understood by one of ordinary skill in the art. Although such sensors may drift, their drift is less than the reference sensors 110, is negligible, or can be frequently calibrated over some definable time period so the gold-standard sensor 105 provides measurements that are within the tolerated amount of error from truth. When used in connection with different embodiments of different processes disclosed herein, the gold-standard sensor 105 measures atmospheric conditions (e.g., pressure and/or temperature).

Each reference sensor 110 may comprise one or more different sensors, including a pressure sensor and/or a temperature sensor. Pressure sensors of reference sensors 110 are assumed to drift over time, which requires calibration (e.g., numerical adjustments to reference pressures that were determined using measurements of pressure measured by the pressure sensors). Temperature sensors of reference sensors 110 can also drift over time, or can overheat, which does not necessarily require calibration, but may require use of another temperature value from another source during certain operations disclosed herein (e.g., FIG. 3, FIG. 4, and FIG. 5). When used in connection with different embodiments of different processes disclosed herein, a reference sensor 110 measures atmospheric conditions (e.g., pressure and/or temperature).

When the gold-standard sensor 105 or the reference sensor 110 measures a pressure at a sensor altitude, $h_{sensor}$, the measured pressure, $P_{sensor}$, may be converted to a reference pressure, $P_{ref}$, that specifies an estimated pressure at a reference altitude, $h_{ref}$, where the conversion may be provided by the following equation, or another suitable equation:

$$P_{ref} = P_{sensor} \exp\left(\frac{gM(h_{sensor} - h_{ref})}{RT_{remote}}\right), \quad \text{(Equation 4)}$$

where $T_{remote}$ is measured at the location of the sensor or another location that may be subject to over-heating. Conversion of a measured pressure to a reference pressure may occur at the gold-standard sensor 105 or the reference sensor 110, or at another device like the server device 130, the mobile device 120, or another device. The reference pressure(s) may be used as described later with reference to different embodiments FIG. 3, FIG. 4, and FIG. 5.

Figure 2:
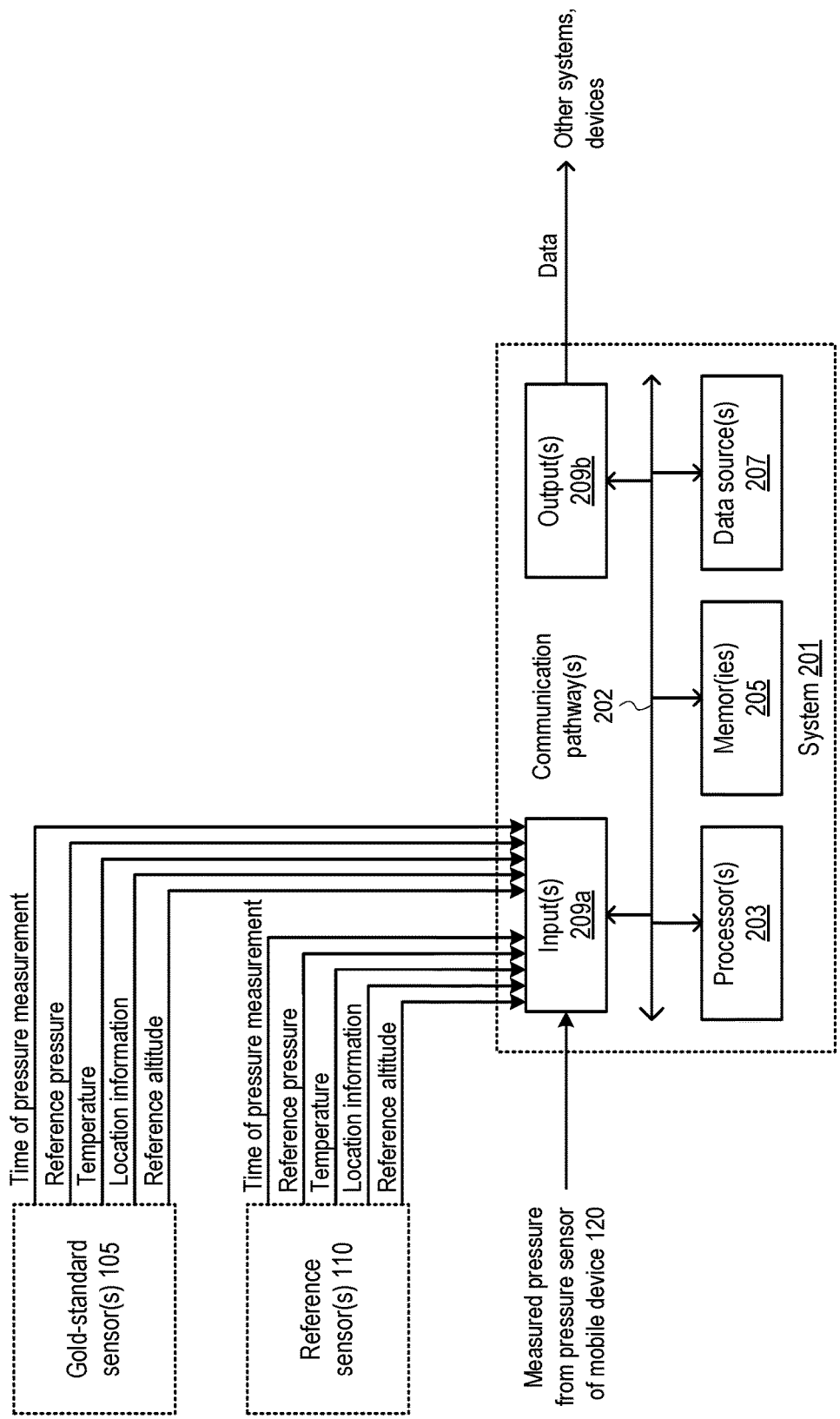
FIG. 2 depicts a system for use in performing operations described herein, including operations that determine values of atmospheric conditions for use in estimating an altitude of a mobile device.

By way of example, FIG. 2 depicts components of a system 201 for use in performing operations described herein, including operations that determine values of atmospheric conditions for use in estimating an altitude of a mobile device 120. In different embodiments, the components of the system 201 may reside in the mobile device 120, the server device 130, and/or other devices. The components of the system 201 may be co-located in one device, or may be distributed throughout a network across different devices.

As shown in FIG. 2, the system 201 includes one or more communication pathways 202 that interconnect various components together as would be known in the art. In one embodiment, the pathways 202 include one or more buses connected to each other through various bridges, controllers and/or adapters as is well known in the art. Other pathways are contemplated, including both wireless and wired pathways.

One or more processors 203 are coupled to one or more memories 205 using the pathway(s) 202. The one or more memories 205 may include one or more non-transitory processor-readable media embodying program instructions that, when executed by the one or more processors 203, cause the one or more processors 203 to perform or implement operations disclosed herein, including any or all steps related to figures depicting processes. Steps of computing, determining, using, setting and identifying may be performed by the processor(s) 203 or another suitable machine.

One or more data sources 207 that store data are also included in the system 201. The data sources 207 store received, determined, computed or other data during operations disclosed herein. Examples of data stored in the data source 207 include reference pressures, measurements of temperature, estimated altitudes of reference sensors, and potential altitudes in regions, which are discussed later with reference to FIG. 3, FIG. 4, and FIG. 5. Well-known approaches for exchanging data between the data sources 207 and other components (e.g., a processor) may be used during different operations, including such operations of receiving, identifying, setting, and others disclosed herein.

One or more inputs 209a are shown to receive different data from gold-standard sensors 105 and reference sensors 110. Examples of data include reference pressures, measured temperatures, location information, a reference altitude, and a time when a pressure was measured for use in computing the reference pressure. The inputs 209a may also receive data from a pressure sensor of the mobile device 120, which is a component of the system 201 when the system 201 is the mobile device 120. The data may alternatively come from other intermediary device(s) that store or retrieve the data. One or more outputs 209b are shown to send output data to other systems or devices as desired. The inputs 209a and outputs 209b may be any suitable component known in the art.

Examples of reference sensors 110 include, but are not limited to, crowdsourced weather stations like NOAA, Weather Underground, Earth Networks, hobby grade weather stations installed by private individuals at their homes or businesses, or others. A reference sensor 110 could also be another mobile device with a pressure sensor and/or a temperature sensor. When the reference sensor 110 is another mobile device, the remote temperature may be sourced from a temperature sensor of that mobile device or another source like a weather station.

Data such as a reference pressure, reference altitude, measurement of temperature, and location information of a gold-standard sensor 105 or a reference sensor 110 may be received by different devices (e.g., the mobile device 120 or the server 130) from wherever that data is stored. For example, data from weather stations may be provided to a common server (e.g., of the server devices 130), and that data may then be accessed from that common server. Transfer of the data may occur using known wireless or wired transmission technologies. Such data may be used to perform different operations described later with reference to figures depicting processes. In practice, the common server typically cleans and reduces the data using some quality checks. After receiving data from one or more reference sensors 110, the common server may convert measurements of pressure to a reference pressure at a reference altitude (e.g., sea-level) using a measurement of temperature before storing that reference pressure at weather data. In practice, common servers often provide an application program interface (API) or software function call that a mobile device or another server can query to access real-time or historical weather station data that is available. A typical query to the common server will return the weather data for one or more queried weather stations, or for one or more queried regions or locations in a network. Quality control procedures used by publicly-available NOAA weather stations are published in scientific literature. Other quality control procedures used by private entities are often proprietary, but they typically include outlier checks and some model versus measurement checks. However, accuracy of public and private weather stations may be less useful for altitude determination because the data quality is impacted by a non-uniform distribution of weather station sensor types, the absence of routine calibration, stability issues, and lack of monitoring for over-heating conditions at a location where a measurement of temperature is determined. Hence, different approaches for evaluating and using data from different weather stations for altitude determination are discussed below. As understood by one of ordinary skill in the art, the operational environment 100 of FIG. 1 and/or the system 201 of FIG. 2 may carry out different operations of these different approaches.

Figure 3:
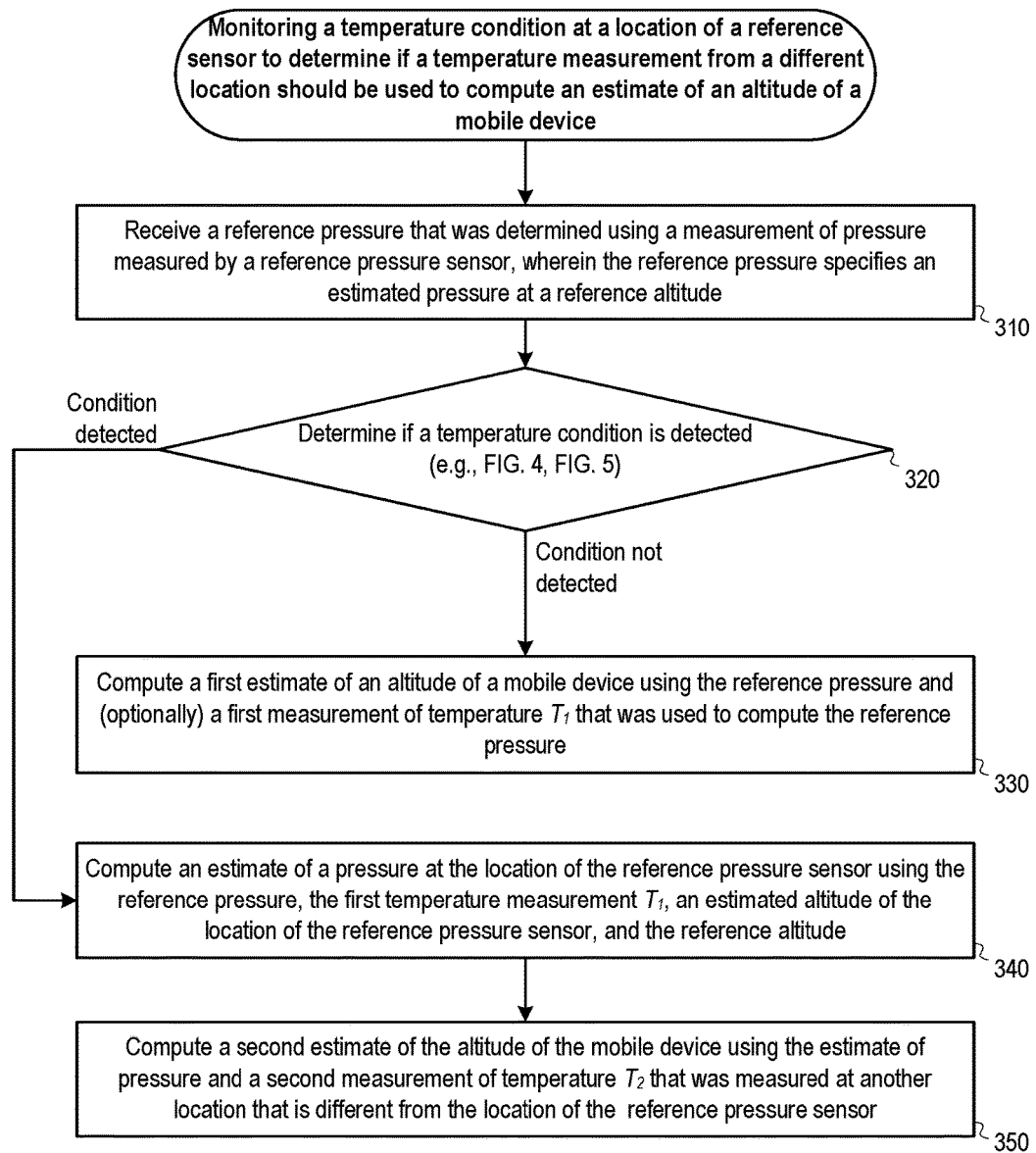
FIG. 3 provides a process for monitoring a temperature measurement condition for a reference sensor to determine if a temperature measurement from a different location should be used to compute a revised reference pressure.

Monitoring a Temperature Condition (FIG. 3)

Approaches for monitoring a temperature condition at a location of a reference sensor (e.g., a temperature sensor) to determine if a temperature measurement from a different location should be used to compute an estimate of an altitude of a mobile device are described below. Detecting unreliable measurements of temperature permits mitigation or correction of those measurements, which improves the accuracy of a computed estimate of a mobile device's altitude.

Unreliable measurements of temperature can be caused by different circumstances. One circumstance involves a temperature sensor providing an inaccurate measurement of temperature due to instrumental error of that sensor (e.g., drift, sensor lag). Another circumstance involves diurnal air temperature variation that occurs during day-time short-wave (e.g., UV and visible light) over-heating of the area around a reference sensor (e.g., heating of surfaces near the sensor), which results in a local temperature of the area around the reference sensor that is different (e.g., higher) than true ambient temperature. By comparison, long-wave (e.g., infrared) cooling of the area around the reference sensor occurs at nighttime. Other circumstances include localized over-heating from a heat-emitting item (e.g., HVAC system or chimney that produces hot exhaust), or localized heating resulting from an item (e.g., a wall or other item) blocking airflow that would otherwise cool the area around the reference sensor. Unreliable measurements of temperature manifest as temperature errors, which can give rise to barometric altitude errors.

As discussed previously, a reference pressure ($P_{ref}$) derived from a measurement of pressure at a location of a reference pressure sensor and a measurement of temperature from that location or another location can be computed as follows:

$$P_{ref} = P_{sensor} \exp\left(-\frac{gM(h_{ref} - h_{sensor})}{RT_{remote}}\right). \quad \text{(Equation 5)}$$

where $P_{sensor}$ is the measurement of pressure (e.g., a measurement of pressure at a location of a reference pressure sensor), $T_{remote}$ is the measurement of temperature (e.g., a measurement of temperature at the location of the reference pressure sensor or another location sourced by a weather station), $h_{ref}$ is the reference altitude, $h_{sensor}$ is the altitude of the reference sensor, g corresponds to the acceleration due to gravity, R is the universal gas constant, and M is the molar mass of air (e.g., dry air or other). If the measurement of temperature ($T_{remote}$) is inaccurate, the reference pressure ($P_{ref}$) will also be inaccurate even when the measurement of pressure ($P_{sensor}$) is accurate.

Altitude error can be caused by different factors, including (i) temperature error, and (ii) altitude differences between a mobile device and a reference pressure sensor. As discussed previously, an altitude of a mobile device ($h_{mobile}$) can be computed using the following barometric formula:

$$h_{mobile} = \frac{RT_{remote}}{gM} \ln\left(\frac{P_{mobile}}{P_{ref}}\right) + h_{ref}. \quad \text{(Equation 6)}$$

Altitude error can be illustrated by computing the differential of Equation 6 as follows:

$$\frac{h_{mobile} - h_{reference}}{T} = \frac{\Delta h_{mobile}}{\Delta T}, \quad \text{(Equation 7)}$$

which leads to $$\Delta h_{mobile} = (h_{mobile} - h_{ref}) \times \frac{\Delta T}{T_{remote}}. \quad \text{(Equation 8)}$$

If the difference in temperature ($\Delta T$) between the measurement of temperature ($T_{remote}$) and true ambient temperature in a region exceeds a tolerated amount of temperature, then any estimate of a mobile device's altitude will exceed a tolerated amount of altitude error from true altitude of the mobile device.

As discussed previously, it is not uncommon for overheating to occur at the location of a reference sensor (e.g., a temperature sensor) due to direct sunlight, exposure to heat from an item in the local environment (e.g., HVAC system, a surface), or another reason. The overheating will result in an inaccurate measurement temperature, which would produce an inaccurate reference pressure that in turn would produce an inaccurate estimate of an altitude of a mobile device. Thus, detecting when a reference pressure is based on an inaccurate measurement of temperature would be advantageous and, in some cases like emergency response situations, would be critical.

As discussed further below, different approaches for monitoring measurements of temperature can be used to determine whether a reference pressure based on a particular measurement of temperature is reliable. If the reference pressure is reliable (i.e., if the measurement of temperature is determined to be accurate), then the reference pressure and even the measurement of temperature may be used to compute an estimate of a mobile device's altitude.

A process for monitoring a temperature measurement condition for a reference sensor to determine if a temperature measurement from a different location should be used to compute a revised reference pressure is shown in FIG. 3.

As shown, a reference pressure that was determined using a measurement of pressure measured by a reference pressure sensor is received (step 310). By way of example, the reference pressure may specify an estimated pressure at a reference altitude (e.g., sea-level).

A determination is made as to whether a temperature condition is detected (step 320). Embodiments of step 320 are described later with reference to FIG. 4 and FIG. 5.

If the temperature condition is not detected, the process proceeds to step 330. If the temperature condition is detected, the process proceeds to step 340.

When the temperature condition is not detected during step 320, a first estimate of the altitude of the mobile device is computed using the reference pressure and (optionally) a first measurement of temperature, $T_1$, that was used to compute the reference pressure (step 330). By way of example, the first estimate of the altitude is computed using the following equation:

$$h_{mobile} = h_{ref} \mp \frac{RT_1}{gM} \ln\left(\frac{P_{ref}}{P_{mobile}}\right), \quad \text{(Equation 9)}$$

where $h_{mobile}$ is the first estimate of the altitude, $P_{ref}$ is the reference pressure received in step 310 that is an estimate of pressure at a reference altitude $h_{ref}$ (e.g., sea-level), $P_{mobile}$ is a measurement of pressure from the mobile device, g corresponds to the acceleration due to gravity, R is the universal gas constant, and M is the molar mass of air (e.g., dry air or other). Alternatively, the received reference pressure may be combined with other reference pressures to compute a final reference pressure, $P_{ref\_final}$, that is used instead of the received reference pressure $P_{ref}$ in the above equation. In some embodiments, a different temperature other than the first measurement of temperature, $T_h$ may be used with Equation 9.

When the temperature condition is detected during step 320, an estimate of a pressure at the location of the reference pressure sensor is computed using the reference pressure ($P_{ref}$), the first temperature ($T_1$), an estimated altitude of the location of the reference pressure sensor, and the reference altitude (step 340). By way of example, the estimate of a pressure ($P_{sensor}$) at the location of the reference pressure sensor is computed using the following equation:

$$P_{sensor} = P_{ref} \exp\left(-\frac{gMh}{RT_1}\right), \quad \text{(Equation 10)}$$

where h equals ($h_{sensor} - h_{ref}$), $h_{ref}$ is a reference altitude, and $h_{sensor}$ is the estimated altitude of the reference pressure sensor.

In some embodiments, the estimate of the pressure ($P_{sensor}$) can be converted to a new reference elevation reference pressure ($P'_{ref}$) using the second measurement of temperature ($T_2$) as follows:

$$P'_{ref} = P_{sensor} \exp\left(\frac{gMh}{RT_2}\right). \quad \text{(Equation 11)}$$

Equations 10 and 11 can be combined as:

$$P'_{ref} = P_{ref} \exp\left(\frac{gMh}{RT_2}\right) \exp\left(-\frac{gMh}{RT_1}\right). \quad \text{(Equation 12)}$$

Equation 12 can be written as:

$$P'_{ref} = P_{ref} \exp\left(\left(\frac{1}{T_2} - \frac{1}{T_1}\right) \times \frac{gMh}{R}\right) \quad \text{(Equation 13)}$$

In some embodiments, the estimated altitude of a reference pressure sensor ($h_{sensor}$) is known and received (e.g., retrieved from a look-up table or reported by the reference pressure sensor). In other embodiments, the estimated altitude is unknown, and other location information associated with the reference pressure sensor can be used to determine an estimated altitude for that reference pressure sensor. The location information may be reported by the reference pressure sensor, looked up from a database using an identifier of the reference pressure sensor to identify the location information in the database, or received another way. Location information may be associated with an altitude that is accessed (e.g., reported, looked up, or otherwise determined), and then used as the estimated altitude of the location of the reference pressure sensor. Location information may include an address, latitude and longitude, a name (e.g., of an area or a building at which the reference pressure sensor is located), or other information. By way of example, the estimated altitude may be identified as a stored altitude of a building having an address that is associated with the reference pressure sensor (e.g., a building on which reference pressure sensor is positioned). Alternatively, the estimated altitude may be identified as a type of altitude that is within a threshold distance of the location information or within an area identified by the location information. The type of altitude may be a roofline altitude of the tallest or shortest building, an altitude of a ground level, an average altitude of buildings, or other altitudes.

Figure 6:
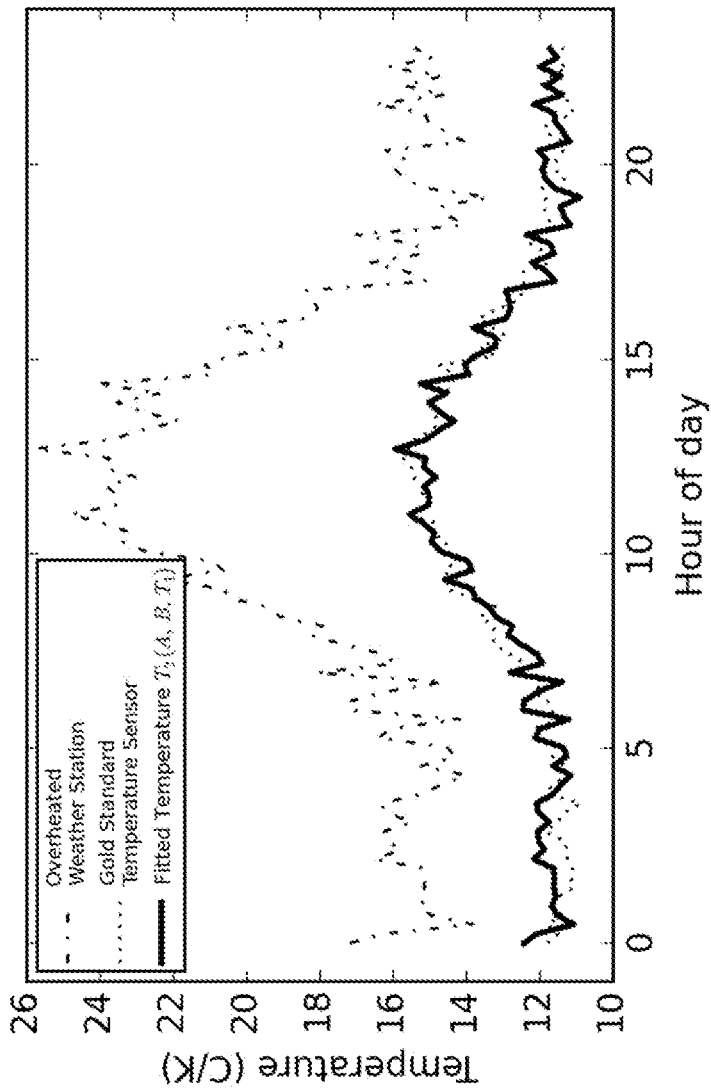
FIG. 6 depicts a diagram illustrating a functional fit for one embodiment.

After step 340, a second estimate of the altitude of the mobile device is computed using the estimate of pressure and a second measurement of temperature $T_2$ that was measured at another location that is different than the location where the first measurement of temperature $T_1$ was measured (step 350). In different embodiments, the second measurement of temperature $T_2$ is measured at a location of a second reference sensor or a gold-standard sensor. Alternatively, other temperature values may be substituted for the second measurement of temperature $T_2$. For example, the other temperature value may be a temperature value $T_2'$ that is generated from previous weather data like a weather almanac for the same or similar region, time period, and/or conditions (e.g., a single temperature or combination of temperatures (i) for the same day in previous year(s), (ii) for a different day, (iii) for a different region, (iv) for a day when similar atmospheric conditions were present, or (v) another scenario). Alternatively, the other temperature value may be a temperature value $T_2''$ that is a functional fit of the first measurement of temperature $T_1$ (e.g., $T_2''=T_2(A,B,T_1)=A*T_1+B$. FIG. 6 depicts a diagram illustrating a functional fit where A=0.4 and B=5.4.

By way of example, the second estimate of the altitude ($h_{mobile}'$) is computed using any of the following equations:

$$h'_{mobile} = -\frac{RT_2}{gM}\ln\left(\frac{P'_{ref}}{P_{mobile}}\right), \quad \text{(Equation 14)}$$

or $$h'_{mobile} = -\frac{RT_2}{gM}\ln\left(\frac{P_{ref}}{P_{mobile}}\exp\left(\left(\frac{1}{T_2}-\frac{1}{T_1}\right)\times\frac{gMh}{R}\right)\right), \quad \text{(Equation 15)}$$

or $$h'_{mobile} = -\frac{RT_2}{gM}\ln\left(\frac{P_{ref}}{P_{mobile}}\right) - \frac{RT_2}{gM}\ln\left(\exp\left(\left(\frac{1}{T_2}-\frac{1}{T_1}\right)\times\frac{gMh}{R}\right)\right), \quad \text{(Equation 16)}$$

or $$h'_{mobile} = -\frac{RT_2}{gM}\ln\left(\frac{P_{ref}}{P_{mobile}}\right) - hT_2\left(\frac{1}{T_2}-\frac{1}{T_1}\right), \quad \text{(Equation 17)}$$

or $$h'_{mobile} = -\frac{RT_2}{gM}\ln\left(\frac{P_{ref}}{P_{mobile}}\right) - hT_2\left(\frac{T_1-T_2}{T_2T_1}\right), \quad \text{(Equation 18)}$$

or $$h'_{mobile} = -\frac{RT_2}{gM}\ln\left(\frac{P_{ref}}{P_{mobile}}\right) - h\left(\frac{T_1-T_2}{T_1}\right), \quad \text{(Equation 19)}$$

where h equals ($h_{sensor}-h_{ref}$), $P_{ref}$ is the reference pressure received in step 310 that is an estimate of pressure at the reference altitude $h_{ref}$, $h_{sensor}$ is the estimated altitude of the reference pressure sensor, $P_{mobile}$ is a measurement of pressure from the mobile device, g corresponds to the acceleration due to gravity, R is the universal gas constant, and M is the molar mass of air (e.g., dry air or other).

Embodiments of step 320 are described below with reference to FIG. 4 and FIG. 5.

Determine if a Temperature Condition is Detected (320)

Figure 4:
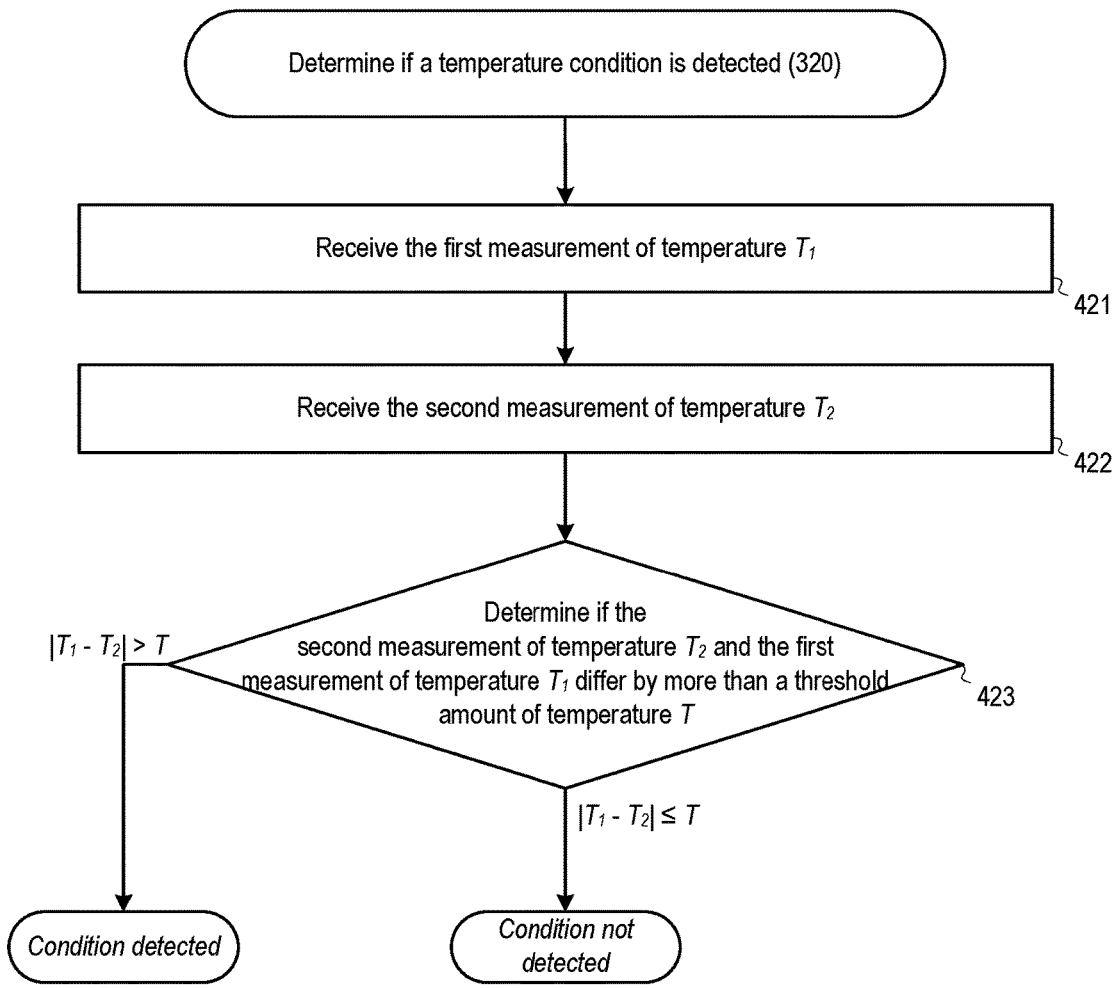
FIG. 4 provides a process for determining if a temperature condition is detected during the process for monitoring a temperature measurement condition.

A first implementation for determining if a temperature condition is detected at step 320 includes sub-steps provided in FIG. 4. As shown, the first measurement of temperature $T_1$ is received (step 421). The second measurement of temperature $T_2$ (or an alternative temperature value) is received (step 422). A determination is made as to whether the second measurement of temperature $T_2$ and the first measurement of temperature $T_1$ differ by more than a threshold amount of temperature T (step 423). If $|T_1-T_2|\leq T$, the temperature condition is not detected, and the process proceeds to step 330 of FIG. 3. If $|T_1-T_2|>T$, the temperature condition is detected, and the process proceeds to step 340 of FIG. 3. Examples of the threshold amount of temperature T include T=10 Celsius, Kelvin, Fahrenheit, or other. In certain embodiments, $T_1$ and $T_2$ are measured within a time threshold of each other (e.g., within 2 hours, 30 minutes, or less than 30 minutes), and the threshold can change depending on a weather pattern in the region within which $T_1$ and $T_2$ are measured.

Figure 5:
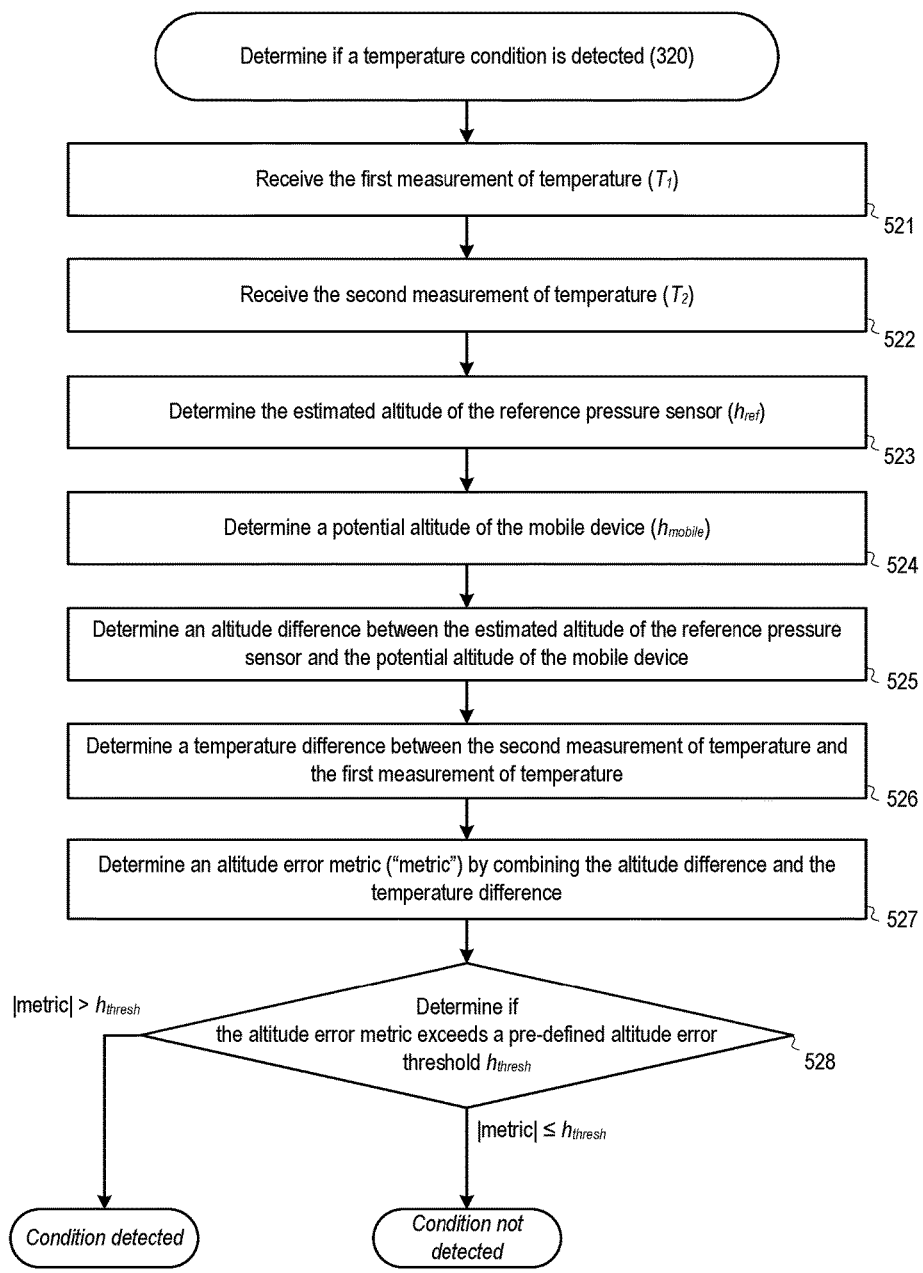
FIG. 5 provides a process for determining if a temperature condition is detected during the process for monitoring a temperature measurement condition.

A second implementation for determining if a temperature condition is detected at step 720 includes sub-steps provided in FIG. 5. As shown, the first measurement of temperature $T_1$ is received (step 521). The second measurement of temperature $T_2$ (or an alternative temperature value) is received (step 522). The estimated altitude of the reference pressure sensor ($h_{ref}$) is determined (step 523). A potential altitude of the mobile device ($h_{mobile}$) is determined (step 524)—e.g., examples of potential altitudes of the mobile device are described in another paragraph below. An altitude difference between the estimated altitude of the reference pressure sensor and the potential altitude of the mobile device ($h_{ref}-h_{mobile}$) is determined (step 525). A temperature difference (e.g., a fractional temperature difference like $(T_2-T_1)/T_1$ or $(T_2-T_1)/T_2$) between the second measurement of temperature and the first measurement of temperature is determined (step 526). An altitude error metric is determined by combining the altitude difference and the temperature difference—e.g., $(h_{ref}-h_{mobile})*(T_2-T_1)/T_1$ or $(h_{ref}-h_{mobile})*(T_2-T_1)/T_2$ (step 527). A determination is made as to whether the altitude error metric ("metric") exceeds a predefined altitude error threshold $h_{thresh}$ (step 528). If the altitude error metric does not exceed the altitude error threshold (e.g., $|metric|\leq h_{thresh}$), the temperature condition is not detected, and the process proceeds to step 330 of FIG. 3. If the altitude error metric exceeds the altitude error threshold (e.g., $|metric|>h_{thresh}$), the temperature condition is detected, and the process proceeds to step 340 of FIG. 3. Examples of the altitude error threshold $h_{thresh}$ include 1 meter, 2 meters, or other.

As discussed above, a potential altitude of the mobile device ($h_{mobile}$) is determined during step 524. This potential altitude may be determined using different approaches. In a first approach, the potential altitude is an estimated altitude that is based on positioning signals (e.g., from a terrestrial or satellite positioning system) as is known in the art. In a second approach, the potential altitude is an estimated altitude determined by adjusting a previous estimated altitude with a value of estimated movement by the mobile device from a location corresponding to the previous estimated altitude to a location for which the estimate of the mobile device's altitude is computed during step 330 or step 350. In a third approach, the potential altitude is determined by calculating the lowest altitude in a given region, where the region is identified for a given latitude and longitude (e.g., an estimate of a mobile device's latitude and longitude), and the lowest altitude for the region is identified from a database storing altitudes of terrain in the region. In one implementation of the third approach, a confidence value associated with latitude and longitude is determined, and the region is a confidence region that is based on the latitude, longitude, and confidence value, which may be different than a region identified for a different confidence value or no confidence value. In another implementation of the third approach, the region has pre-defined parameters (e.g., 5 square kilometers centered on the latitude and longitude). Depending on the region, altitudes of subterranean areas can be used as the lowest altitude (e.g., basements, underground parking, or other areas that are below ground level.

Other Aspects

The term altitude used herein may refer to an altitude, an elevation, or a height.

Any discussion above relating to use of a measurement of temperature at a location of a reference pressure sensor extends to use of alternative measurements of temperature, including a measurement of temperature at another location that is inaccurate but initially used to compute a reference pressure.

Methods of this disclosure may be implemented by hardware, firmware or software. One or more non-transitory machine-readable media embodying program instructions that, when executed by one or more machines, cause the one or more machines to perform or implement operations comprising the steps of any of the methods described herein are contemplated. As used herein, machine-readable media includes all forms of machine-readable media (e.g. non-volatile or volatile storage media, removable or non-removable media, integrated circuit media, magnetic storage media, optical storage media, or any other storage media) that may be patented under the laws of the jurisdiction in which this application is filed, but does not include media that cannot be patented under the laws of the jurisdiction in which this application is filed.

By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art. Systems that include one or more machines or the one or more non-transitory machine-readable media embodying program instructions that, when executed by the one or more machines, cause the one or more machines to perform or implement operations comprising the steps of any methods described herein are also contemplated.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a mobile device can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together, or separated by one or more intervening things. Where no lines and intervening things connect two particular things, coupling of those things is contemplated in at least one embodiment unless otherwise stated. Where an output of one thing and an input of another thing are coupled to each other, information sent from the output is received by the input even if the data passes through one or more intermediate things. Different communication pathways and protocols may be used to transmit information disclosed herein. Information like data, instructions, commands, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

A mobile device may include any of: antenna module(s) for exchanging signals with other systems; RF front end module(s) with circuitry components that are known; processing module(s) for signal processing of received signals to determine position information (e.g., times of arrival or travel time of received signals, atmospheric information from transmitters, and/or location or other information associated with each transmitter); processing module(s) for using the position information to compute an estimated position of the mobile device; processing module(s) for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device (e.g., pressure, temperature, other), which may be compared to the same environmental conditions at or near transmitters to determine the altitude of the mobile device; other sensor module(s) for measuring other conditions (e.g., movement, orientation); interface module(s) for exchanging information with other systems via other links other than a radio link; and/or I/O module(s) for permitting user interaction with the mobile device.

RELATED APPLICATIONS

This application relates to the following related application(s): U.S. Pat. Appl. No. 62/467,716, filed 6 Mar. 2017, entitled IMPROVING CROWDSOURCED WEATHER DATA FOR USE IN BAROMETRIC-BASED NAVIGATION AND LOCATION SERVICES. The content of each of the related application(s) is hereby incorporated by reference herein in its entirety.

The invention claimed is:
1. A method for monitoring one or more conditions before estimating an altitude of a mobile device, wherein the method comprises:
receiving a reference pressure that was determined using a measurement of pressure measured by a reference pressure sensor, wherein the reference pressure specifies an estimated pressure at a reference altitude;
determining if a temperature condition is detected;
after determining that the temperature condition is not detected, computing a first estimate of an altitude of a mobile device using the reference pressure; and
after determining that the temperature condition is detected,
(i) computing an estimate of a pressure at the location of the reference pressure sensor using the reference pressure, a first measurement of temperature that was used to compute the reference pressure, an estimated altitude of the location of the reference pressure sensor, and the reference altitude, and
(ii) computing a second estimate of the altitude of the mobile device using the estimate of pressure and a second measurement of temperature that was measured at another location that is different from the location of the reference pressure sensor.

2. The method of claim 1, wherein if the temperature condition not detected, the first estimate of the altitude of the mobile device is computed using the first measurement of temperature.

3. The method of claim 1, wherein determining if the temperature condition is detected comprises:
determining if the second measurement of temperature and the first measurement of temperature differ by more than a threshold amount of temperature;
after determining that the second measurement of temperature and the first measurement of temperature differ by more than the threshold amount of temperature, determining that the temperature condition is detected; and
after determining that the second measurement of temperature and the first measurement of temperature do not differ by more than the threshold amount of temperature, determining that the temperature condition is not detected.

4. The method of claim 1, wherein determining if the temperature condition is detected comprises:
determining a potential altitude of the mobile device;
determining an altitude difference between the estimated altitude of the location of the reference pressure sensor and the potential altitude of the mobile device;
determining a temperature difference between the second measurement of temperature and the first measurement of temperature;
determining an altitude error metric by combining the altitude difference and the temperature difference;
determining if the altitude error metric exceeds a pre-defined altitude error threshold;
after determining that the altitude error metric exceeds the pre-defined altitude error threshold, determining that the temperature condition is detected; and
after determining that the altitude error metric does not exceed the pre-defined altitude error threshold, determining that the temperature condition is not detected.

5. The method of claim 4, wherein determining the potential altitude comprises:
identifying a region;
determining the lowest altitude in the identified region; and
determining that the potential altitude is the lowest altitude in the identified region.

6. The method of claim 4, wherein determining the altitude error metric comprises:
multiplying the altitude difference and the temperature difference.

7. The method of claim 6, wherein the temperature difference is computed by determining a difference between the second measurement of temperature and the first measurement of temperature, and dividing the difference by either the second measurement of temperature or the first measurement of temperature.

8. One or more non-transitory machine-readable media embodying program instructions that, when executed by one or more machines, cause the one or more machines to implement a method for monitoring one or more conditions before estimating an altitude of a mobile device, wherein the method comprises:
receiving a reference pressure that was determined using a measurement of pressure measured by a reference pressure sensor, wherein the reference pressure specifies an estimated pressure at a reference altitude;
determining if a temperature condition is detected;
after determining that the temperature condition is not detected, computing a first estimate of an altitude of a mobile device using the reference pressure; and
after determining that the temperature condition is detected,
(i) computing an estimate of a pressure at the location of the reference pressure sensor using the reference pressure, a first measurement of temperature that was used to compute the reference pressure, an estimated altitude of the location of the reference pressure sensor, and the reference altitude, and
(ii) computing a second estimate of the altitude of the mobile device using the estimate of pressure and a second measurement of temperature that was measured at another location that is different from the location of the reference pressure sensor.

9. The one or more non-transitory machine-readable media of claim 8, wherein if the temperature condition not detected, the first estimate of the altitude of the mobile device is computed using the first measurement of temperature.

10. The one or more non-transitory machine-readable media of claim 8, wherein determining if the temperature condition is detected comprises:
determining if the second measurement of temperature and the first measurement of temperature differ by more than a threshold amount of temperature;
after determining that the second measurement of temperature and the first measurement of temperature differ by more than the threshold amount of temperature, determining that the temperature condition is detected; and
after determining that the second measurement of temperature and the first measurement of temperature do not differ by more than the threshold amount of temperature, determining that the temperature condition is not detected.

11. The one or more non-transitory machine-readable media of claim 8, wherein determining if the temperature condition is detected comprises:
determining a potential altitude of the mobile device;
determining an altitude difference between the estimated altitude of the location of the reference pressure sensor and the potential altitude of the mobile device;
determining a temperature difference between the second measurement of temperature and the first measurement of temperature;

determining an altitude error metric by combining the altitude difference and the temperature difference;

determining if the altitude error metric exceeds a pre-defined altitude error threshold;

after determining that the altitude error metric exceeds the pre-defined altitude error threshold, determining that the temperature condition is detected; and after determining that the altitude error metric does not exceed the pre-defined altitude error threshold, determining that the temperature condition is not detected.

12. The one or more non-transitory machine-readable media of claim 11, wherein determining the potential altitude comprises:

identifying a region;

determining the lowest altitude in the identified region; and determining that the potential altitude is the lowest altitude in the identified region.

13. The one or more non-transitory machine-readable media of claim 11, wherein determining the altitude error metric comprises:

multiplying the altitude difference and the temperature difference.

14. The one or more non-transitory machine-readable media of claim 13, wherein the temperature difference is computed by determining a difference between the second measurement of temperature and the first measurement of temperature, and dividing the difference by either the second measurement of temperature or the first measurement of temperature.

15. A system for monitoring one or more conditions before estimating an altitude of a mobile device, wherein the system comprises one or more machines that are operable to perform operations comprising:

receiving a reference pressure that was determined using a measurement of pressure measured by a reference pressure sensor, wherein the reference pressure specifies an estimated pressure at a reference altitude;

determining if a temperature condition is detected;

after determining that the temperature condition is not detected, computing a first estimate of an altitude of a mobile device using the reference pressure; and after determining that the temperature condition is detected, (i) computing an estimate of a pressure at the location of the reference pressure sensor using the reference pressure, a first measurement of temperature that was used to compute the reference pressure, an estimated altitude of the location of the reference pressure sensor, and the reference altitude, and (ii) computing a second estimate of the altitude of the mobile device using the estimate of pressure and a second measurement of temperature that was measured at another location that is different from the location of the reference pressure sensor.

16. The system of claim 15, wherein if the temperature condition not detected, the first estimate of the altitude of the mobile device is computed using the first measurement of temperature.

17. The system of claim 15, wherein determining if the temperature condition is detected comprises:

determining if the second measurement of temperature and the first measurement of temperature differ by more than a threshold amount of temperature;

after determining that the second measurement of temperature and the first measurement of temperature differ by more than the threshold amount of temperature, determining that the temperature condition is detected; and after determining that the second measurement of temperature and the first measurement of temperature do not differ by more than the threshold amount of temperature, determining that the temperature condition is not detected.

18. The system of claim 15, wherein determining if the temperature condition is detected comprises:

determining a potential altitude of the mobile device;

determining an altitude difference between the estimated altitude of the location of the reference pressure sensor and the potential altitude of the mobile device;

determining a temperature difference between the second measurement of temperature and the first measurement of temperature;

determining an altitude error metric by combining the altitude difference and the temperature difference;

determining if the altitude error metric exceeds a pre-defined altitude error threshold;

after determining that the altitude error metric exceeds the pre-defined altitude error threshold, determining that the temperature condition is detected; and after determining that the altitude error metric does not exceed the pre-defined altitude error threshold, determining that the temperature condition is not detected.

19. The system of claim 18, wherein determining the potential altitude comprises:

identifying a region;

determining the lowest altitude in the identified region; and determining that the potential altitude is the lowest altitude in the identified region.

20. The system of claim 18, wherein determining the altitude error metric comprises:

multiplying the altitude difference and the temperature difference, wherein the temperature difference is computed by determining a difference between the second measurement of temperature and the first measurement of temperature, and dividing the difference by either the second measurement of temperature or the first measurement of temperature.

* * * * *